May 12, 1925. 1,537,153

H. I. STENGEL

SELF ADJUSTING SHACKLE

Filed Feb. 17, 1922

Henry Ivan Stengel
Inventor

By Warren S. Orton.
Attorney

Patented May 12, 1925.

1,537,153

UNITED STATES PATENT OFFICE.

HENRY IVAN STENGEL, OF NEW YORK, N. Y., ASSIGNOR, BY MESNE ASSIGNMENTS, TO UPPERCU CADILLAC CORPORATION, OF NEW YORK, N. Y., A CORPORATION OF NEW YORK.

SELF-ADJUSTING SHACKLE.

Application filed February 17, 1922. Serial No. 537,145.

*To all whom it may concern:*

Be it known that I, HENRY IVAN STENGEL, a citizen of the United States, and resident of New York city, in the county of New York and State of New York, have invented certain new and useful Improvements in Self-Adjusting Shackles, of which the following is a specification.

The invention relates to a vehicle spring shackle of the type in which two relatively movable members are pivotally coupled through the agency of one or more bolts passing through connecting side links.

In automotive vehicle construction difficulty has been experienced because the lateral side faces of the connecting links, bushings, bolt heads and nuts, and the other relatively movable parts of the spring shackles wear very rapidly and the parts quickly develop a looseness of fit and resulting rattle after the device has been in use for a short period of time.

Attempts have been made to remedy this condition as by hardening the spring shackles which resulted in rendering them brittle and thus easily broken; by interposing hard bearing plates which merely delayed the eventual looseness of parts; and by interposing some kind of a spring between the nut on one end of the bolt and the adjacent side link. This construction only partially remedied the difficulty and had the very serious disadvantage in that the parts are free to become displaced and bear on the springs which have to give way whenever a bump or obstruction is hit by the vehicle wheels. The side links are thus driven apart and as the spring recovers, it forces the links back against the spring eyes or spring eye and chassis parts thus setting up the objectionable rattle which the construction is intended to eliminate.

Accordingly, an object of the invention is to provide a simple form of self-adjusting shackle which will maintain its parts in a preset condition unaffected by vibration or jars on the vehicle parts and which will automatically compensate for wear on the radial friction surfaces of the several parts and thus tend to maintain a continuity of preset operative relation in the construction.

Broadly I attain this phase of the invention by initially tightening up the bolt nut on the usual pivotal shackle bolt, thus eliminating any possibility of loose play should the parts be jarred, and by placing the nut under a torque force, such as a coiled spring under tension, acting thereon to tighten the nut whenever the wearing away of the parts held by the bolt permits a turning movement of the nut on the threads of the bolt.

It will be readily appreciated that the wearing away of friction surfaces in a device of this class will be gradual and slow and that any delay in the turning of the nut during the initial periods of loose play will tend to permit rattle and thus increase the normal rate of wear on the surfaces.

Accordingly, the invention features the utilization of lubrication applied to reduce the frictional resistance to the turning movement of the tightening-up nut and to reduce the frictional resistance and the inertia of the parts during the slow adjusting movement of the parts longitudinally of the bolt.

This feature of the invention is attained by housing the turning nut in a lubricant containing casing which also acts as a dust cap, and in providing means for conducting lubricant to those frictional surfaces forming part of the shackle which surfaces tend to resist the readjusting of the parts by the shifting nut as the surfaces wear away.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Figure 1:
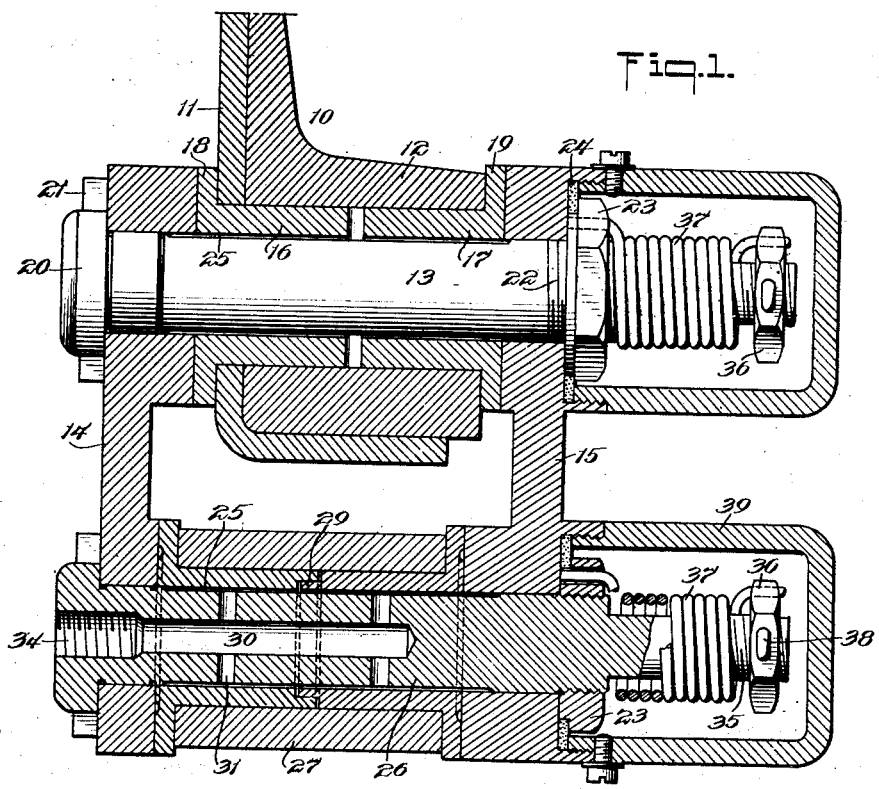
Figure 1 is a sectional view taken axially of the bolts in a spring shackle illustrating a preferred embodiment of the invention.
Figure 3:
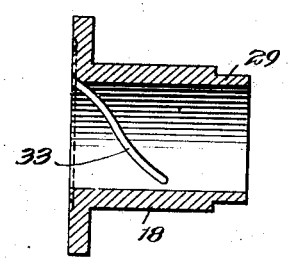
Figure 3 is a longitudinal sectional view of one of the bushing parts.
Figure 2:
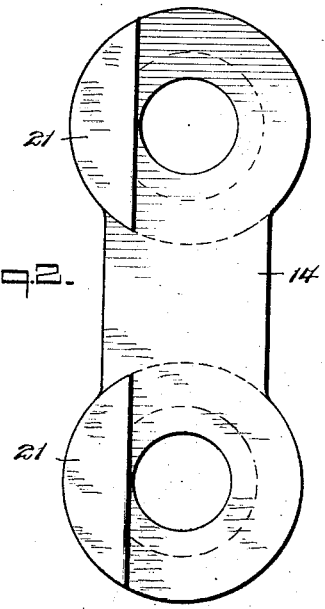
Figure 2 is a view in side elevation of the left side link shown in Figure 1.

In the drawing there is shown a support 10 the part 11 of which may be considered as the side frame of a vehicle chassis provided with a supporting eye 12 which may of course be part of a spring suspension.

A shackle bolt 13 is carried by the support 10, is passed through the eye 12 and has a pair of side links 14, 15 pivotally suspended therefrom. A split bearing formed of parts 16, 17 are disposed on the bolt between the same and the support and the parts are provided at opposite ends with bearing flanges 18, 19 disposed between the lateral ends of the eye and the adjacent sides of the links. The bolt is provided at one end with a head 20 in bearing engagement with the adjacent link and held from turning by the engagement with a stop 21 formed on the outer face of the link. Beyond the other link the bolt is threaded as shown at 22 to receive a tightening-up nut 23 in bearing engagement with the other link 15 through a washer 24.

The portion of the bolt surrounded by the bushing is grooved longitudinally as shown at 25 to conduct lubricant to the smooth portion of the bolt shank carrying the hubs and bushings.

Similarly the lower ends of the links have a bolt 26 passed therethrough and which forms a pivotal connection for a spring eye 27 and disposed between which eyes, bolt and links is another split bearing 28 having a lap joint engagement 29 between the two parts.

Reference will be made to the lower shackle elements in the following detailed description of the invention but it is to be understood that corresponding parts are present in the upper shackle elements.

Figure 4:
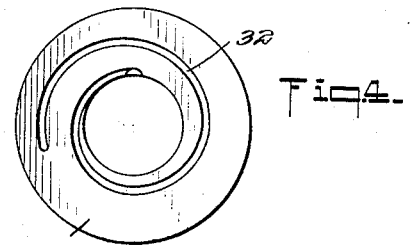
Figure 4 is a view of the left end of the part shown in Figure 3.

The bolts are provided with a longitudinally extending lubricant passageway 30 which leads through diametrically extending passageways 31 to the longitudinal grooves at 25. The bearing faces defining the outer faces of the bushing flanges 18, 19 are provided with a spiral shaped groove 32 (Figure 4) the inner end of which is in communication with the end of a spiral groove 33 formed on the bore of the bushing parts. From this construction it will be apparent that a lubricant cup screwed into the socket 34 at the outer ends of the bolts will supply lubricant to the surfaces between the bolt and bearings, between the bushings and links, between the bolt and links and between the bushings and bolts and in this way the parts will be free to respond readily and promptly to the action of the turning nut 23 as hereinafter more fully described.

In assembling the parts it will be understood that the nut 23 may be advanced on the bolt until the desired tension is placed on the bolt and the different parts between the bolt head and nut are held against relative longitudinal movement while permitting the desired freedom of turning movement in the spring eye. In this way the side links are held rigidly in place in the same manner as is known at present in some conventional similar structure.

The present disclosure features the automatic advancing of the nut 23 as the radial friction surfaces of the spring eye, links and bushings wear away. For this purpose the usual length of bolt is extended and threaded as shown at 35 and a second nut 36 engages the threads. A helical spring 37 is mounted on the extended part of the bolt and has its ends prolonged with one end inserted in the nut 23 and the other in the nut 36. Assuming that the nut 23 is prevented from turning further and that there is no clearance between the radial friction surfaces, the nut 36 may be turned and the spring 37 loaded to any desired degree and the nut locked in place by a cotter pin, 38.

In order to maintain the nut 23 and associated parts lubricated and free from the infiltration of dirt, dust and the like, a cap 39 is threaded on to a boss 40 projecting from the link 15 and coacts with the link to form a lubricant containing housing for the nuts and their associated spring.

In operation it will be understood that the shackle functions in the manner similar to the operation of other such devices where the parts are screwed up tight to prevent rattle. The device herein disclosed has the further advantage in that the parts are at all times screwed up tight for when wear takes place the energy stored up in the spring automatically takes up the play by turning the nut.

Having thus described my invention, I claim:

1. In a spring shackle, the combination of mechanism for pivotally connecting an eye and link, said mechanism including clamping means acting rigidly for securing the eye and link against a separating movement in one direction and including an automatically acting adjustment tending constantly to act in the opposite direction to maintain the clamping effect of the mechanism and means for supplying lubricant to said mechanism.

2. In a spring shackle, the combination of a spring eye and a link, a bolt providing a pivotal connection for the bolt and link, means for preventing rotary movement of the bolt, a tightening up nut on the bolt for securing the eye and link fixed against relative movement longitudinally of the bolt, power means for turning the nut on the bolt and means providing a single source of lubricant supply for lubricating said nut and the inter-engaging parts of said eye, link and bolt.

3. In a spring shackle, the combination of a spring eye and a link, a bolt providing a pivotal connection for the bolt and link, means for preventing rotary movement of the bolt, a nut on the bolt for securing the eye and link fixed rigidly against relative movement longitudinally of the bolt, power means for turning the nut on the bolt and lubricating means acting to reduce the frictional resistance to the turning movement of the nut.

4. In a spring shackle, the combination of a side link provided with an opening, a bolt extending through said opening, a nut on the bolt and bearing on said link, a cap coacting with the part of the link about the opening to form a lubricant containing housing for the nut, and a spring within the housing for turning the nut.

5. In a spring shackle, the combination of a pair of links, a spring eye therebetween, a bolt extending through the links and eye, automatically acting means coacting with the bolt for preventing the separating of the links under service conditions and for compensating for wear between the links and the eye and lubricating means acting to reduce the frictional resistance of the links to move relative to the bolt under the influence of compensating means.

Signed at New York city, in the county of New York and State of New York, this eight day of February, A. D. 1922.

HENRY IVAN STENGEL.

Witnesses:
 SPRUILLE BURFORD CROSSMAN,
 HAZEL PEARL RICKETTS.